United States Patent [19]

Hochstrate

[11] 4,291,369
[45] Sep. 22, 1981

[54] VOLTAGE MULTIPLIER AND DRIVER CIRCUIT

[75] Inventor: Paul E. Hochstrate, Bristol, Conn.

[73] Assignee: Timex Corporation, Waterbury, Conn.

[21] Appl. No.: 77,258

[22] Filed: Sep. 19, 1979

[51] Int. Cl.³ .............................................. H02H 7/25
[52] U.S. Cl. ....................................................... 363/60
[58] Field of Search .......................................... 363/60

[56] References Cited

U.S. PATENT DOCUMENTS 3,944,908  3/1976  Oki ......................................... 363/60
3,997,832  12/1976  Tanaka et al. ........................ 363/60
4,134,057  1/1979  Portmann ......................... 363/60 X Primary Examiner—William M. Shoop
Attorney, Agent, or Firm—William C. Crutcher

[57] ABSTRACT

A voltage multiplier and driver circuit for energizing a backlight or lamp device in a timepiece. The circuit includes switching transistors responsive to an alternating signal for alternately disconnecting the lamp (load) while a capacitor is connected across a DC voltage source and for reconnecting the lamp (load) across a series (voltage additive) connection of the DC voltage source and the charged capacitor. The alternating signal frequency and duty cycle are selected to energize the lamp (load) to a predetermined color temperature.

8 Claims, 1 Drawing Figure

4,291,369

VOLTAGE MULTIPLIER AND DRIVER CIRCUIT

BACKGROUND OF THE INVENTION

This invention relates generally to an improved voltage multiplier and driver circuit for use in a timepiece. It is particularly directed to the provision of a circuit means for energizing a lamp device in a timepiece.

Timepieces for some time now have used backlights to enable viewing where the ambient light condition is relatively poor.

The use of a backlight, particularly in a low voltage battery powered timepiece such as a portable clock or wristwatch, imposes a number of conditions upon the design of the driver circuit, VIZ:

It must have a very low power consumption;
It must be capable of energizing a lamp to luminese, i.e., have voltage-current rating, while operating from a relatively low voltage supply;
It must be inexpensive;
It must utilize a minimum number of components and optimize use of the available space within the timepiece.

The present invention provides an improved voltage multiplier and driver circuit which satisfies the above noted conditions.

The following patents represent some of the prior art pertinent to the field of voltage multipliers and backlights for timepieces: U.S. Pat. Nos. 2,980,816 issued Apr. 18, 1961 to Elmer Curry Payne; 3,673,572 issued June 27, 1972 to Philip O. Sliva; 4,068,295 issued Jan. 10, 1978 to Hubert Portmann; 3,955,353 issued May 11, 1976 to Brian Astle; 3,824,447 issued July 16, 1974 to Tsuneo Kuwabara and 3,008,429 issued Feb. 15, 1977 to James M. Phalan.

These patents are mentioned as being representative of the prior art and other pertinent patents may exist.

SUMMARY OF THE INVENTION

In the preferred embodiment of the invention the circuit comprises switching means responsive to a control signal for alternately connecting (first) a capacitor as a load across a DC voltage source and (next) connecting said capacitor as a voltage source in series with the DC voltage source across a lamp device such that the lamp device is periodically impulsed by the sum of the DC voltage source and the capacitor voltage. The periodicity, duty cycle and voltage of the impulses are selected to energize the lamp device to a predetermined color temperature.

Accordingly, an object of the invention is to provide a new and improved driver circuit for energizing a backlight or lamp device in a timepiece.

Another object of this invention is to provide a new and improved voltage multiplier circuit.

A further object of this invention is to provide a new and improved voltage multiplier and driver arrangement for providing voltage/current impulses to a load.

Further advantages and objectives of the present invention will be apparent from the following detailed description of the preferred embodiment of the invention.

DETAILED DESCRIPTION OF THE INVENTION

Figure 1:
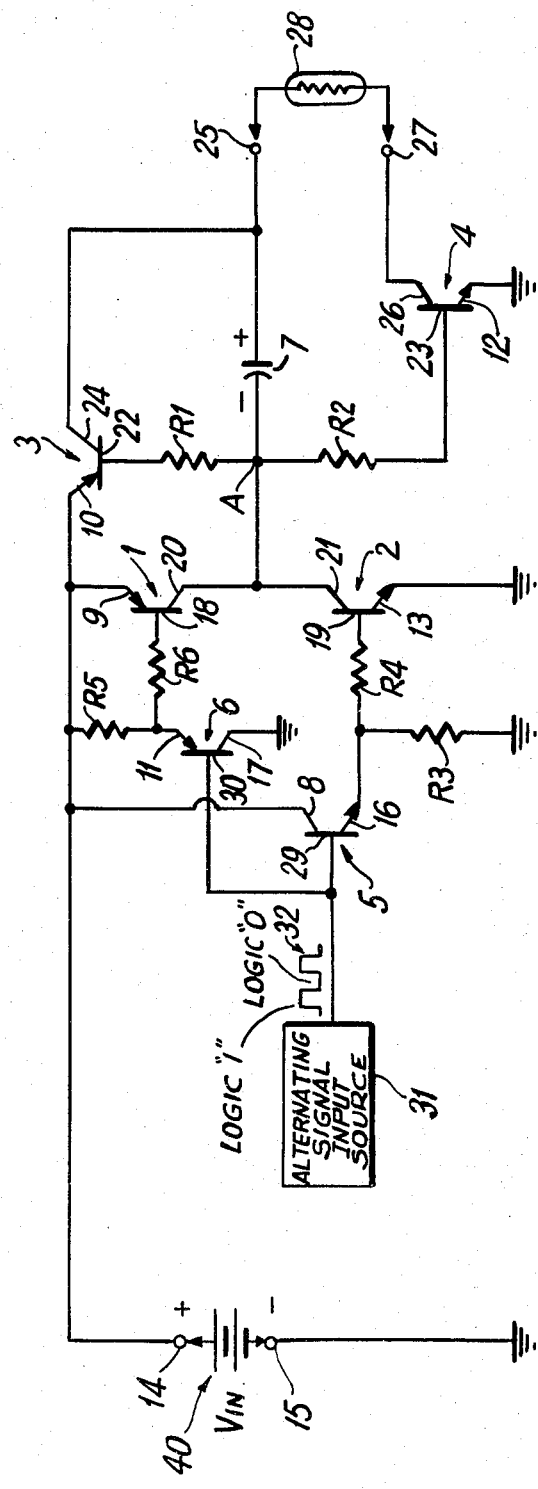
FIG. 1 is a schematic diagram of the voltage multiplier and driver circuit according to the invention.

FIG. 1 is a detailed description of the best presently contemplated mode of carrying out the invention.

With reference to FIG. 1, the voltage multiplier and driver circuit comprises six transistors 1–6, a capacitor 7 and six resistors R1–R6.

The input power source 40 is a battery or direct current (DC) variable voltage source which varies between approximately 1.5 and 5 volts. The positive and negative terminals of the input power source 40 are connected to terminals 14 and 15, respectively.

The collector 8 of transistor 5 and the emitters 9, 10 of transistors 1 and 3, respectively, are connected to terminal 14. The emitter 11 of transistor 6 is connected, via resistor R5, to terminal 14.

The emitters 12 and 13 of the transistors 4 and 2, respectively, and emitter 16, via resistor R3, are connected to terminal 15, i.e., the negative terminal of the input power source 40. Terminal 15 and, therefore, the negative terminal of the input power source 40 is selected as the reference or ground potential for the circuit.

The collector 17 of transistor 6 is connected to the reference potential.

The base electrode 18, 19, via resistors R6 and R4 respectively, are connected to emitters 11 and 16, respectively. The collectors 20, 21 of transistors 1 and 2 are connected together and to the connection between resistors R1, R2 and one terminal (−) of capacitor 7, defining a junction point A. The other end of resistor R1, is connected to base 22 of transistor 3. And the other end of resistor R2 is connected to base 23 of transistor 4.

The collector 24 of transistor 3 is connected to a first output terminal 25 and the other (+) terminal of capacitor 7.

The collector 26 of transistor 4 is connected to a second output terminal 27.

The lamp 28 is connected across the first and second output terminals 25, 27. The lamp 28 is provided to illuminate a display of a timepiece, meter, calculator or the like (not shown).

The base electrode 29, 30 of transistors 5 and 6 are connected to an alternating signal input source 31. The alternating signal input source 31 provides alternating signal 32 having a variable frequency between approximately 200 and 2 KHZ.

Assuming for the moment that there is no signal input 32, transistors 1 and 2 are switched off, i.e., non-conducting, since the base 18 of PNP transistor 1 is connected, via resistors R6 and R5, to the positive terminal 14 and the base 19 of NPN transistor 2 is connected, via resistors R4 and R3, to the negative terminal 15. Junction point A is floating and, therefore, transistors 3 and 4 being of opposite conductivity type are prevented from connecting the lamp 28 across terminals 14 and 15.

In operation, as the logic "1" (positive) portion of the input signal 32 is applied to the bases 29, 30 of transistors 5 and 6, transistor 5 is switched on, i.e., conducting and transistor 6 is switched off, i.e., non-conducting. With transistor 5 switched on, base 19 is connected to the positive voltage terminal 14 potential, neglecting any voltage drop across transistor 5, which causes transistor 2 to be switched on connecting junction point A to the negative or ground voltage terminal 15.

A negative potential at junction point A causes transistor 4 to be switched off, disconnecting the lamp (load) 28 and output terminal 27 from the negative terminal 15 of the input voltage source 40, and causes transistor 3 to be switched on.

Switching on transistors 3 and 2 connects capacitor 7 across terminals 14 and 15 causing capacitor 7 to be charged approximately to the voltage potential of the power source 40.

As the logic "0" (negative) portion of the input signal 32 is applied to the bases 29, 30 of transistors 5 and 6, transistor 5 is switched off and transistor 6 is switched on.

Switching off transistor 5 results in switching off transistor 2 which disconnects junction point A from the negative terminal 15.

Switching on transistor 6 causes base 18 to approach the ground or negative potential of terminal 15, neglecting any voltage drop across transistor 6, which causes transistor 1 to be switched on connecting junction point A to the positive voltage terminal 14.

With junction point A connected to the positive voltage terminal 14, transistor 3 is switched off and transistor 4 is switched on.

Switching on transistor 4 couples the lamp (load) 28 in series between negative terminal 15, via output terminal 27 and transistor 4, and the positive terminal 14 via capacitor 7 and transistor 1. Capacitor 7 is connected in series circuit between the lamp (load) 28 and the input voltage source 40 and, being previously charged as shown, in series additive polarity with the input voltage source 40. In the above manner, the lamp (load) 28 is connected across the sum or additive voltage potentials of the input voltage $V_{in}$ plus the capacitor (charged voltage) $V_c$, i.e., $V_{lamp} = V_c$ during each logic "0" control signal.

The above cycle is repeated to provide drive pulses to the lamp (load) 28 having periodicity proportional to the frequency of the input alternating signal 32.

The potential of the input voltage source 40 and the frequency of the input alternating signal 32 are variable to permit controlled variation of the color temperature of the lamp 28.

While a wide variety of types of lamp or backlight devices, transistors, frequencies, voltage-batteries or power sources may be employed, the circuit illustrated may be employed, the circuit illustrated in FIG. 1 was constructed and successfully operated using the following components:

Voltage source 40: 1.5 to 5 VDC
Input Alternating signal 32: 200–2 KHZ
Transistors 2, 5, 4: (Texas Instru.) 2 N 4401
Transistors 1, 6, 3: (Texas Instru.) 2 N 4403
Resistors 3, 5: 33 K Ohms
Resistors 4, 6: 100 Ohms
Resistors 1, 2: 270 Ohms
Capacitor 7: 50 uf, 6V DC
Lamp 28: 180 ma type While there has been described herein what is considered to be the preferred embodiment of the invention, other modifications may occur to those skilled in the art, and it is intended that the appended claims to cover all such modifications fall within the true spirit and scope of the invention.

I claim:

1. A voltage multiplier and driver circuit energized by a DC supply voltage source comprising:
    means for providing an alternating control signal;
    first and second switch means connected in series across the DC supply voltage source each being responsive to the alternating control signal for alternately connecting first and second terminals of the DC supply voltage source to the connection between said first and second switch means defining a junction;
    a capacitor connected between a first terminal for a load device to be energized and the common junction between said first and second switch means;
    third switch means connected between the first terminal of the DC supply voltage source and a second junction between the capacitor and the first terminal for a load device and responsive to said control signal for periodically connecting the first terminal of the DC supply voltage to said second junction; and
    fourth switch means connected between the second terminal of the DC supply voltage source and a second terminal for a load device and responsive to said control signal for periodically connecting the second terminal for a load device to the second terminal of the DC supply voltage source; whereby during each alternate half cycle of the alternating control signal the second and third switch means are rendered conductive to connect the capacitor in parallel circuit relationship across the DC supply voltage source and thereby charge the capacitor to the voltage of the supply voltage source with the first and fourth switch means being maintained off, and during the remaining alternate half cyles of the control signal the first and fourth switch means are rendered conductive with the second and third switch means turned off to thereby connect the DC supply voltage source and the capacitor in its charged state in series circuit aiding relationship across the load device terminals.

2. A voltage multiplier and driver circuit as in claim 1, wherein:
    the first switch means is connected between the first terminal of the DC supply voltage source and the second switch means; and
    the first terminal is the positive terminal and the second terminal is the negative terminal of the DC supply voltage source.

3. A voltage multiplier and drive circuit as in claim 2, wherein:
    the control signal is an alternating square wave signal having a logic "1" and a logic "0" signal portion.

4. A voltage multiplier and drive circuit as in claim 3, wherein:
    the first and third switch means are PNP type transistors and the second and fourth switch means are NPN type transistors.

5. A circuit comprising:
    a DC supply voltage source having a positive and a negative terminal;
    a first, second, third and fourth transistor each having a pair of principal conduction electrodes and a control electrode;
    the first transistor having one of its principal conduction electrodes connected to the positive terminal and its other principal conduction electrode connected to one side of a capacitor defining a junction therewith;
    the second transistor having one of its principal conduction electrodes connected to the negative terminal and its other principal conduction electrode connected to the junction;

the third transistor has one of its principal conduction electrodes connected to the positive terminal and its other principal conduction electrode connected to the other end of said capacitor defining a first output terminal;

a fourth transistor has one of its principal conduction electrodes connected to the negative terminal and its other principal conduction electrode defining a second output terminal;

means for connecting a load device between said first and second output terminals;

a first resistor connected between the control electrode of the third transistor and the junction;

a second resistor connected between the control electrode of the fourth transistor and the junction; and means providing a control signal to the control electrodes of the first and second transistors for alternately switching on and off said first and fourth transistors while switching off and on said second and third transistors, and vice versa.

6. A circuit as in claim 5, wherein:

the first and third transistors are of the PNP type;

the second and fourth transistors are of NPN type; and the control signal alternates between positive and negative voltage values.

7. In combination:

a DC supply voltage source having a first and second terminal;

means providing an alternating control signal;

first, second, third, fourth, fifth and sixth transistors each having a pair of principal conduction electrodes and a control electrode, the fifth and sixth transistors being of different conductivity types and each have the control electrode thereof coupled to said means providing an alternating control signal;

said fifth transistor having one principal conduction electrode connected to the first terminal of the DC supply voltage source and its other principal conduction electrode connected to a first junction defined by a connection of one end of a third resistor to one end of a fourth resistor, the other end of said third resistor being connected to said second terminal of the DC supply voltage source, and the other end of said fourth resistor being connected to the control electrode of said second transistor, said sixth transistor having one principal conduction electrode connected to the second terminal of the DC supply voltage source and its other principal conduction electrode connected to a second junction defined by a connection of one end of a fifth resistor to one end of a sixth resistor, the other end of said fifth resistor being connected to said first terminal of the DC supply voltage source, and the other end of said sixth resistor being connected to the control electrode of said first transistor, said first transistor having one principal conduction electrode connected to the first terminal of the DC supply voltage source and its other principal conduction electrode connected to a third junction defined by the connection of one side of a capacitor and the juncture of a first and second resistor connected in series circuit relationship between the control electrodes of the third and fourth transistors, said second transistor being of opposite conductivity type from said first transistor and having one principal conduction electrode connected to the second terminal of the DC supply voltage source and its other principal conduction electrode connected to said third junction, said third transistor having one principal conduction electrode connected to the first terminal of the DC supply voltage source, its other principal conduction electrode connected to the other side of said capacitor to define a first output terminal at the point of interconnection, and its control electrode being connected to one end of said first resistor, said fourth transistor having one principal conduction electrode connected to the second terminal of the DC supply voltage source, its other principal conduction electrode defining a second output terminal, and its control electrode being connected to one end of said second resistor; and illumination means connected across said first and second output terminals for emitting light in response to an output voltage developed across said first and second output terminals.

8. The combination as in claim 7, wherein:

the first and second terminals are a positive and a negative voltage terminal respectively of a direct current supply voltage source between approximately 1.5 volts to 5 volts;

the second, fourth and fifth transistors are NPN type transistors;

the first, third and sixth transistors are PNP type transistors;

the control signal is an alternating square wave having a frequency between 200 HZ and 2 KHZ.

* * * * *